United States Patent
Smolen et al.

(10) Patent No.: US 10,621,809 B2
(45) Date of Patent: Apr. 14, 2020

(54) DIGITAL CURRENCY ENABLED VENDING MACHINE

(71) Applicants: Christopher M. Smolen, Newport, NY (US); Stuart Card, Newport, NY (US)

(72) Inventors: Christopher M. Smolen, Oneida, NY (US); Stuart Card, Newport, NY (US)

(73) Assignees: Christopher M. Smolen, Oneida, NY (US); Stuart Card, Newport, NY (US)

( * ) Notice: Subject to any disclaimer, the term of this patent is extended or adjusted under 35 U.S.C. 154(b) by 646 days.

(21) Appl. No.: 14/955,636

(22) Filed: Dec. 1, 2015

(65) Prior Publication Data

US 2016/0086418 A1    Mar. 24, 2016

Related U.S. Application Data

(63) Continuation-in-part of application No. 13/744,436, filed on Jan. 18, 2013, now abandoned.

(Continued)

(51) Int. Cl.
*G06Q 40/00*     (2012.01)
*G07F 9/00*      (2006.01)
(Continued)

(52) U.S. Cl.
CPC .......... *G07F 9/006* (2013.01); *G06Q 20/065* (2013.01); *G06Q 20/32* (2013.01); *G06Q 20/381* (2013.01); *G07F 11/00* (2013.01)

(58) Field of Classification Search
CPC .... G06Q 20/065; G06Q 20/32; G06Q 20/381; G06Q 20/36; G06Q 20/0453; G06Q 20/10; G06Q 20/105; G06Q 20/351; G06Q 30/06; G06Q 10/06; G06Q 20/06; G06Q 20/08; G06Q 20/20; G06Q 20/227; G06Q 20/3276; G06Q 20/3674; G06Q 20/40;
(Continued)

(56) References Cited

U.S. PATENT DOCUMENTS

| 5,450,938 A | 9/1995 | Rademacher |
| 5,553,736 A | 9/1996 | Healis |

(Continued)

FOREIGN PATENT DOCUMENTS

| EP | 1699022 A1 * | 9/2006 | ............. G07F 11/00 |
| JP | 2004227203 A * | 8/2004 | |
| WO | WO-2015185527 A1 * | 12/2015 | ............. G06Q 20/02 |

OTHER PUBLICATIONS

Intel, "Intelligent Vending Machine Shipments are Forecasted to Grow at a 49% CAGR."; Industry Report; Nov. 2011; 6 pages; Frost & Sullivan Research Services, United States.

*Primary Examiner* — Rajesh Khattar
(74) *Attorney, Agent, or Firm* — Hoffman Warnick LLC

(57) ABSTRACT

A vending machine is described that uses digital currency transactions to enable a user to purchase items from their portable computing device. Using a control system in communication with various components of the vending machine and an internet connection for communicating with a remote digital currency system, such as a bitcoin network, a digital currency processing system executes digital currency transactions and stores the resulting digital currency in a transaction storage repository. The control system initiates dispensing of purchased items based on communication from the digital currency processing system.

19 Claims, 6 Drawing Sheets

Related U.S. Application Data

(60) Provisional application No. 61/632,154, filed on Jan. 19, 2012.

(51) Int. Cl.
*G06Q 20/32* (2012.01)
*G07F 11/00* (2006.01)
*G06Q 20/38* (2012.01)
*G06Q 20/06* (2012.01)

(58) Field of Classification Search
CPC ............ G06Q 20/405; G06Q 30/0601; G06Q 50/188; G06Q 20/322; G06Q 20/3224; G06Q 20/3272; G06Q 20/3274; G06Q 20/3578; G06Q 20/382; G06Q 30/04; G06Q 40/00; G06Q 40/04; G07F 11/00; G07F 19/00; G07F 9/006
See application file for complete search history.

(56) References Cited

U.S. PATENT DOCUMENTS

| | | | | |
|---|---|---|---|---|
| 5,577,121 A | | 11/1996 | Davis et al. | |
| 5,831,862 A | | 11/1998 | Hetrick et al. | |
| 5,912,721 A | * | 6/1999 | Yamaguchi | G06K 9/0061 351/209 |
| 5,951,397 A | | 9/1999 | Dickenson | |
| 5,959,869 A | * | 9/1999 | Miller | G07F 9/026 221/9 |
| 6,047,270 A | * | 4/2000 | Joao | G06Q 20/04 340/5.4 |
| 6,295,482 B1 | | 9/2001 | Tognazzini | |
| 7,490,054 B2 | | 2/2009 | Reade | |
| 7,587,362 B2 | * | 9/2009 | Karpovich | G06Q 20/00 705/35 |
| 7,783,381 B2 | | 8/2010 | Walker | |
| 7,881,822 B2 | | 2/2011 | Thornton et al. | |
| 7,978,184 B2 | | 7/2011 | Morrison | |
| 8,170,713 B2 | | 5/2012 | Levasseur et al. | |
| 8,283,680 B2 | | 10/2012 | Repetto et al. | |
| 8,417,376 B1 | | 4/2013 | Smolen | |
| 8,554,671 B2 | | 10/2013 | Ballout | |
| 2002/0016829 A1 | * | 2/2002 | Defosse | G06Q 20/04 709/217 |
| 2002/0052965 A1 | * | 5/2002 | Dowling | H04W 36/22 709/230 |
| 2002/0116344 A1 | * | 8/2002 | Kinoshita | G06Q 20/06 705/65 |
| 2003/0004876 A1 | * | 1/2003 | Jacobson | G06Q 20/105 705/41 |
| 2009/0281891 A1 | | 11/2009 | Walker et al. | |
| 2010/0184485 A1 | | 7/2010 | Kim | |
| 2010/0309150 A1 | | 12/2010 | Lee et al. | |
| 2012/0098761 A1 | | 4/2012 | Mitchell et al. | |
| 2012/0197806 A1 | * | 8/2012 | Hill | G06F 21/35 705/67 |
| 2012/0239189 A1 | * | 9/2012 | Jaud | G07F 9/023 700/236 |
| 2013/0065669 A1 | | 3/2013 | Michaelson et al. | |
| 2013/0065670 A1 | | 3/2013 | Michaelson et al. | |
| 2013/0166455 A1 | | 6/2013 | Feigelson | |
| 2014/0058944 A1 | | 2/2014 | Ballout | |
| 2014/0164031 A1 | * | 6/2014 | Salonen | G06Q 10/025 705/5 |
| 2016/0080156 A1 | * | 3/2016 | Kaliski, Jr. | H04L 9/3247 713/176 |
| 2016/0203448 A1 | * | 7/2016 | Metnick | G06Q 20/065 705/64 |

* cited by examiner

DIGITAL CURRENCY ENABLED VENDING MACHINE

PRIORITY

This application is a continuation-in-part of application Ser. No. 13/744,436 filed Jan. 18, 2013, which claims the benefit of U.S. Provisional Application No. 61/632,154 filed Jan. 19, 2012, and the content of said applications is incorporated herein in full by reference.

TECHNICAL FIELD

The subject matter of this invention relates to vending machines, and more particularly to a system and method for enabling the use of digital currency for purchasing items offered for sale from vending machines, including trading one form of currency for another and transferring digital currency funds between a supply or repository within the vending machine (or otherwise accessible to the vending machine) and a user's portable computing device, such as a smartphone.

BACKGROUND

Customers today tend to carry tangible cash (coins & bills) less often and in decreasing amounts than in the past. While modern vending machines are able to offer customers information about the products offered for sale, such as dietary, allergy, and content information in addition to the usual convenience, the prices of merchandise and transaction fees charged by the payment processing networks (credit, debit cards) continue to increase. These trends slow and impede vending machine purchases with tangible cash and/or credit cards. But the speed and convenience of unattended transactions with vending machines offer opportunities for new and improved payment systems. These new payment features have been made possible through a variety of physical, visual and electronic inputs/outputs incorporated directly in the vending apparatus and certain new standalone mobile devices. The greater variety and complexity of products offered through vending machines and the need to hold prices down require greater flexibility in the financial compensation systems for the vended items.

Typically, prior art vending machines required the presentation of currency directly to receiving slots in the machine and receipt of any required change in another slot. Alternatively, the insertion of a financial card type of device into a card reading slot in the vending machine would enable delivery of the item to the buyer. With the advent of the internet and the many mobile data and video devices, transfer of funds from one account to another for payment of purchases or otherwise has become largely electronic.

There is a need for flexible digital payments using portable electronic devices, such as smartphones and tablets, with compatibility with traditional currency and credit cards, reduced transaction costs, economic savings in creation and use, and transactional security for vending machine transactional and payment operations improvements.

SUMMARY

The present disclosure provides a vending machine that uses digital currency transactions to enable a user to purchase items from their portable computing device. Using a control system in communication with various components of the vending machine and an internet connection for communicating with a remote digital currency system, such as a bitcoin network, a digital currency processing system executes digital currency transactions and stores the resulting digital currency in a transaction storage repository. The control system initiates dispensing of purchased items based on communication from the digital currency processing system.

A first aspect provides a vending machine with the means to handle sophisticated financial transactions to meet the needs of the customers by transferring digital currency funds from mobile customer resources to the vending machine digital currency repository and delivering the desired item from the machine.

A second aspect provides a vending machine having ordinary (non-digital) currency receiving and dispensing apparatus with the means to convert one form of funds to another both denomination wise and source wise.

Another aspect provides a vending machine having ordinary currency receiving and dispensing apparatus with the means to process from a mobile device visually transmitted information for the payment of the purchase price of the item in the vending machine.

Another aspect provides a vending machine having ordinary currency receiving and dispensing apparatus with the means to visually receive and process digital currency using QR codes from a portable computing device, such as a smartphone, to pay for dispensing of a desired vending machine item.

Another aspect provides a vending machine having ordinary currency receiving and dispensing apparatus. The vending machine can receive and process digital currency information from a mobile smart phone and use the digital currency received to pay for the vending machine dispensing an alternative currency to the customer.

Another aspect provides a vending machine having ordinary currency receiving and dispensing apparatus. The vending machine can receive and process digital currency information from a user's mobile smart phone and use the digital currency received to access funds, such as bank, credit, or debit accounts linked to a digital wallet, accessible through said smart phone and convert said funds to an alternative currency, including a digital currency, and send to and store said alternative currency on said users smart phone.

Another aspect provides a vending machine having ordinary currency receiving and dispensing apparatus with the means to transfer payment information with a QR code, uniform resource indicator, or similar other visible format code compatible with a decentralized crypto currency system, a digital wallet system, a peer-to-peer digital currency system, centralized digital currency system, or similar other remote digital currency system to a mobile smart device and to receive electronically digital currency payment information from said mobile device to permit delivery of a selected item from the vending machine.

Another aspect provides a vending machine with a plurality of items for purchase, a control system for receiving an item selection and payment information and initiating dispensing of a purchase item, and an internet connection for communicating with a remote digital currency system for settling digital currency transactions. The vending machine further includes a transaction storage repository for storing digital currency transactions and a digital currency processing system for executing digital currency transactions and communicating resulting payment information to the control system enables digital currency payments compatible with the remote digital currency system and its users. The digital currency processing system receives a user initiated digital currency transaction, executes an item purchase digital currency transaction, and initiates a change transaction and the digital currency transactions are stored in the transaction storage repository and settled with the remote digital currency system.

These and other and further aspects are accomplished in part by providing apparatus and software for installation in a vending machine for sending and receiving visual and electronic digital currency payment information from a portable computing device with a compatible digital currency payment system.

DETAILED DESCRIPTION

The term "digital currency" as used herein is defined to include any digital monetary system enabling instant payments to anyone anywhere in the world utilizing internet or like technology to operate remotely, managing transactions and issuing a unique, transferable information-based resource that is accorded monetary value by users. An example category of digital currencies are crypto currencies, in which cryptography is used for controlling the creation of and transactions for units of the currency. The preferred digital currencies for enabling the invention are decentralized systems that rely on peer-to-peer technology without the need for any centralized issuing authority, instead relying on independently operated nodes for distributed issuance, transactions, and clearance. An example of a decentralized crypto currency is Bitcoin and the many similar decentralized crypto currencies that have added incremental improvements to the original Bitcoin systems and processes. Within most digital currencies is some sort of information-based representation of the currency that provides a unique resource that can be transferred within the marketplace of users. For example, a decentralized crypto currency may rely on a uniform resource identifier (URI) corresponding to each unit of the currency (though it may not require that each unit have a uniform denomination) and each URI may in turn require a public/private key set to validate transactions. A URI may include a string of characters, a visual format (such as a bar code or QR code), or any other combination of syntax and protocol capable of uniquely identifying one digital resource from another. QR codes (Quick Response Code) are a particularly popular form of two dimensional visual format system for identifying URIs. Digital wallet generally refers to a portable electronic device that allows an individual to make electronic payment transactions. Digital wallets include a combination of a portable computing device (such as a smartphone, tablet, vehicle control computer, product embedded computing device, or another portable computing device), applications for sending and receiving payment information (generally with an application or instance of the application hosted on the payer device and another on the payee device), and an underlying system architecture that determines the protocols used for authenticating credentials, processing, and clearing transactions. Conventionally, digital wallets have sought to enable a user to access a variety of personal payment methods, including credit and/or debit transactions using one or more traditional financial institutions and ultimately relying on non-digital currency, such as U.S. dollars or another government issued fiat currency. However, any given digital wallet implementation could include the ability to handle digital currency transactions.

Figure 1:
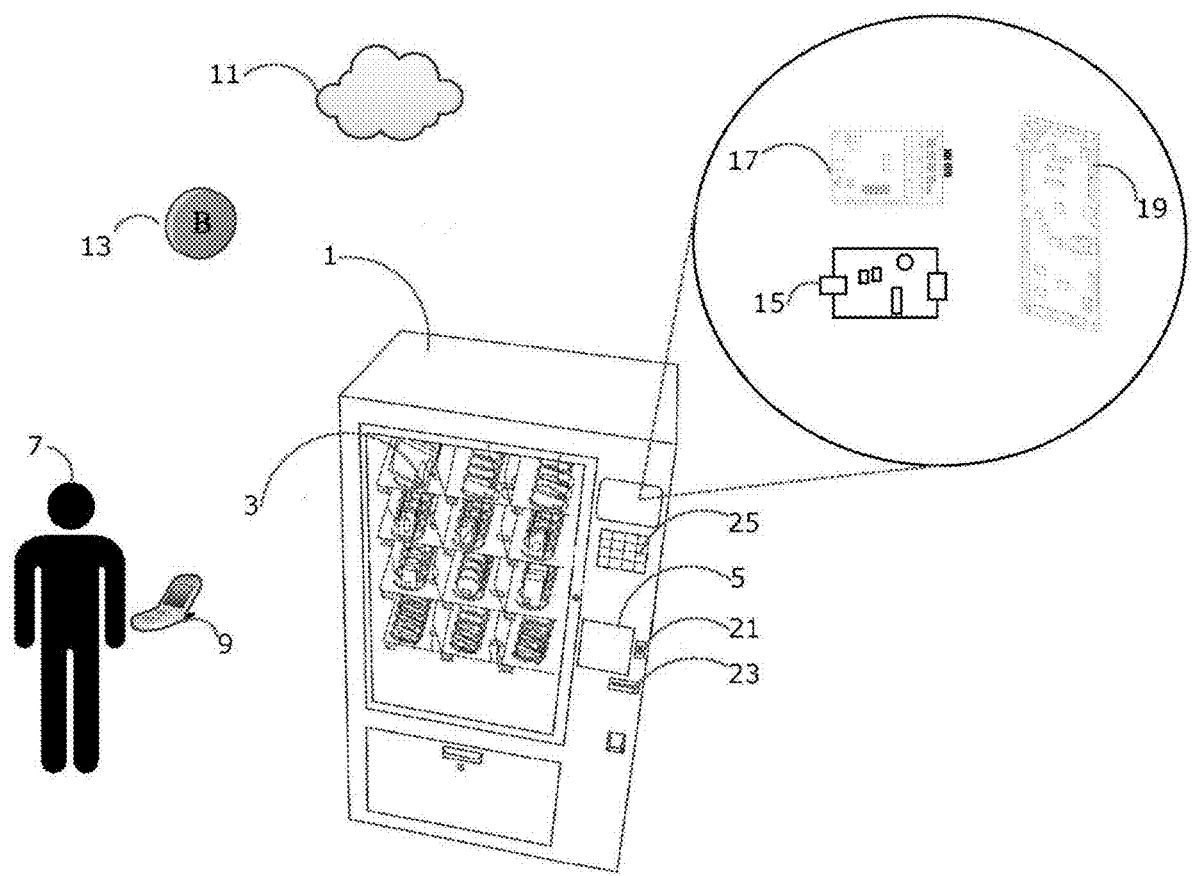
FIG. 1 shows a diagrammatic view of a vending machine and operating environment according to embodiments.

Referring now to FIG. 1 there is shown a vending machine 1 having a variety of items 3 for purchase displayed for sale through a transparent door. The electronic architecture for conducting purchase transactions using vending machine 1 is further described with regard to FIG. 5 below. In the example shown in FIG. 1, a touch panel computer (TPC) 5 is positioned in the machine face adjacent the display area to permit payment information for a selected item to be presented with a QR code or other visible format for reading by a mobile smartphone 9 having camera, display, internet access, and a digital wallet capable of sending and receiving digital currency 13 using QR codes and the like to vending machine 1. Both vending machine 1 and smartphone 9 may access internet 11 in support of their digital currency transactions.

The TPC 5, in addition to displaying the pertinent pricing information, also communicates with the vending machine microprocessor 19 via the computer multi-drop bus (MDB) 15 for handling credit information and with the computer alternative selection device (ASD) 17 for item 3 selection and dispensing information. Key pad 25 may integrate with ASD 17 for enabling item selection. The usual bill validator 23 and coin acceptor/dispenser 21 are shown adjacent the TPC 5 in the face of the machine 1 and also communicate via the MDB 15.

In operation the customer 7 would usually have digital currency stored in the smartphone 9 and would select the desired item 3 via the key pad 25. ASD 17 would then display the pricing information on the screen of TPC 5. Customer 7 with the camera of smartphone 9 would see the price and accept or reject same. The price may be displayed in both a human readable format and an encoded format, such as a QR code, for recognition and use directly by the digital wallet application on smartphone 9. Accepting the price, the customer 7 would then send digital currency in the designated amount through smartphone 9 to vending machine 1. For example, TPC 5 could enable entry of a URI, include a camera for reading a QR code or like visual format displayed on the smartphone 9, or use internet or direct wireless communication (such as Bluetooth) to receive the digital currency 13 from smartphone 9. It should be noted that all of the above has been accomplished in an unattended fashion without tangible U.S. currency or credit protocols resulting in improved transactional and financial efficiency. The digital currency 13 received by the vending machine 1 can be stored for future use or otherwise redeemed in accordance with the protocols of the digital currency system used.

Figure 2:
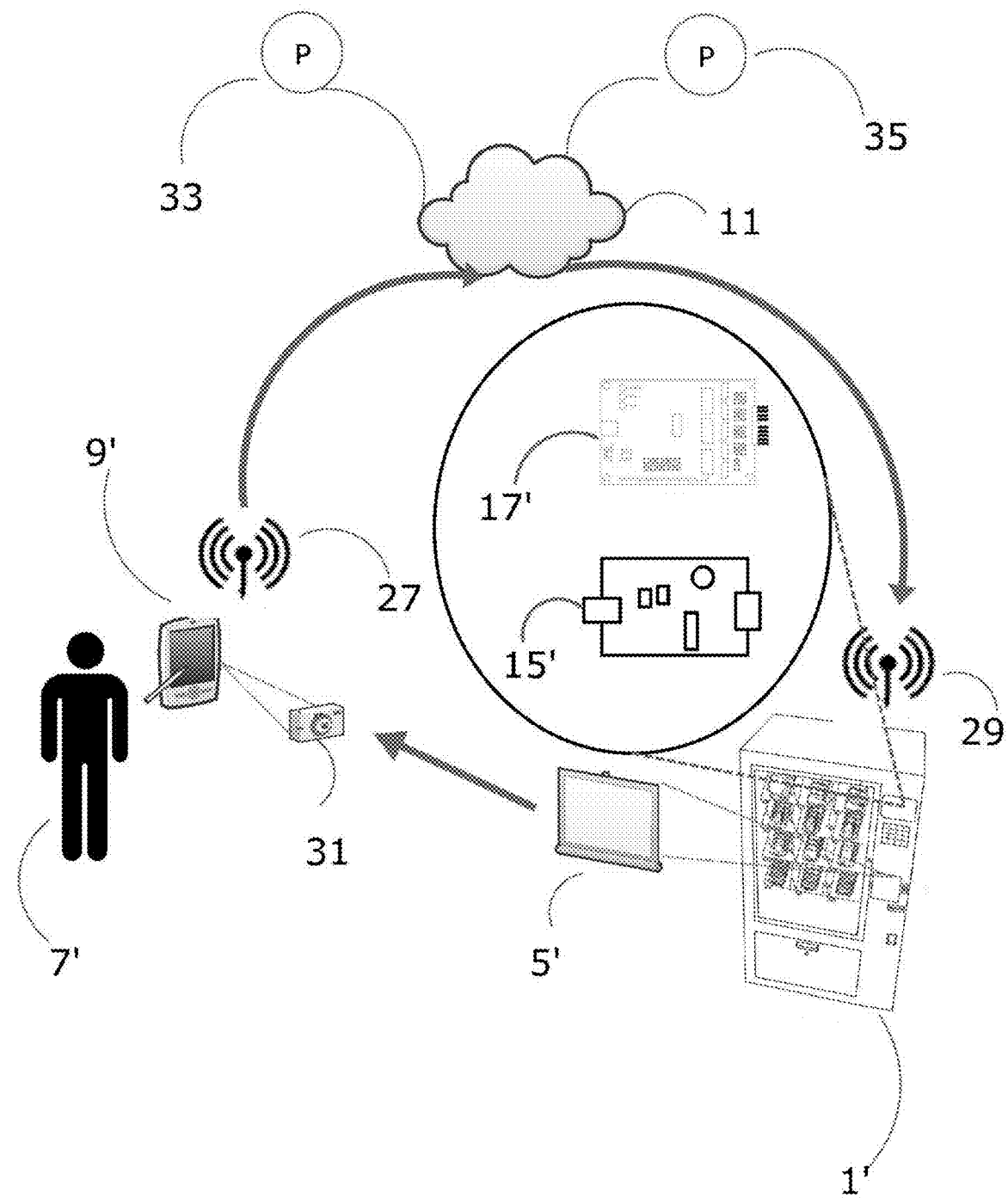
FIG. 2 shows a diagrammatic view of a vending machine and operating environment according to embodiments.

Referring now to FIG. 2 there is shown another example embodiment wherein instead of sending digital currency directly from smart phone 9' to TPC 5', smart phone 9' sends the digital currency in QR code or the like through wireless connection 27 to the internet 11' and thence to wireless connection 29 in vending machine 1' and thence to MDB 15' and when approved to ASD 17' for dispensing of the desired item. In this embodiment camera 31 may be a separate instrument or simply part of smart phone 9'.

In this embodiment, smart phone 9' would receive its digital currency supply as needed from a remote digital currency system, such as a decentralized digital currency 33, cryptocurrency 35 or like source of digital currency. After receiving and storing a supply of digital currency, the required amount of digital currency for the designated transaction would be transferred from smart phone 9' to MDB 15' via the internet 11' and wireless connection 29 in vending machine 1'.

In FIG. 2, the computer microprocessor 19' is additionally programmed to recognize a US currency bill inserted in bill verifying slot 23' and to create and display in QR code or the like digital currency, if selected, on the screen of TPC 5' which is then read by camera 31. Any selected digital currency would then be installed on smart phone 9'. Alternatively TPC 5' will accept and retain the offered US currency and then issue selected other non-digital currency bills or a combination of digital currency and non-digital currency as instructed. This handling of tangible currency by TPC 5' can charge a suitable fee against the digital currency available on the mobile smart phone 9' before approving the exchange and credit the appropriate funds account at the vending machine 1'.

Figure 3:
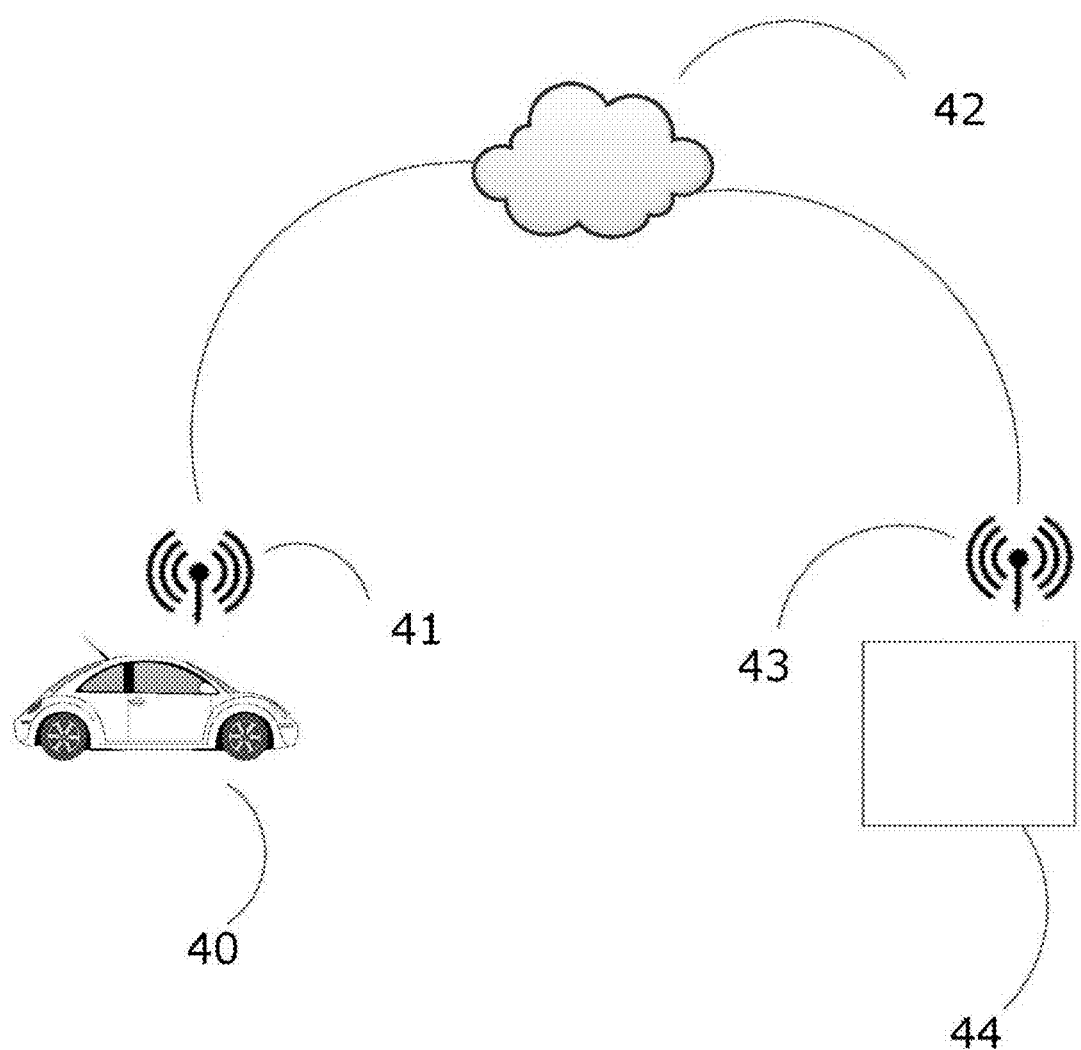
FIG. 3 shows a diagrammatic view of a vending machine and operating environment according to embodiments.

Referring now to FIG. 3 there is shown another example of the present disclosure as directed to the problem of fueling a vehicle 40, including an unoccupied robot vehicle. While the example is directed to a vehicle, it may be more generally understood as an example of a product-embedded computing device that can complete a remote transaction to receive a desired item for purchase, including products or services, using electronic currency and without any direct user oversight or action. Here the vehicle 40 is provided with a vehicle control computer having internet access circuitry capability 41 which can access the internet 42 and via internet connection 43 reach a vending machine, such as a remote fuel vending system with a fueling control computer 44. Vehicle 40 is robotically presented to the fueling facility. Vehicle control computer is provided with a supply of digital currency. This fact and the amount of digital currency is then transmitted to fueling computer 44 via the internet 12 or alternatively as above by visual QR codes or the like. Fueling control computer 44 can then deliver a designated amount of fuel or the amount purchasable with the displayed and transferred digital currency, whichever is appropriate. Again a completely unattended transfer of material can be achieved in an efficient and economical fashion.

Figure 4:
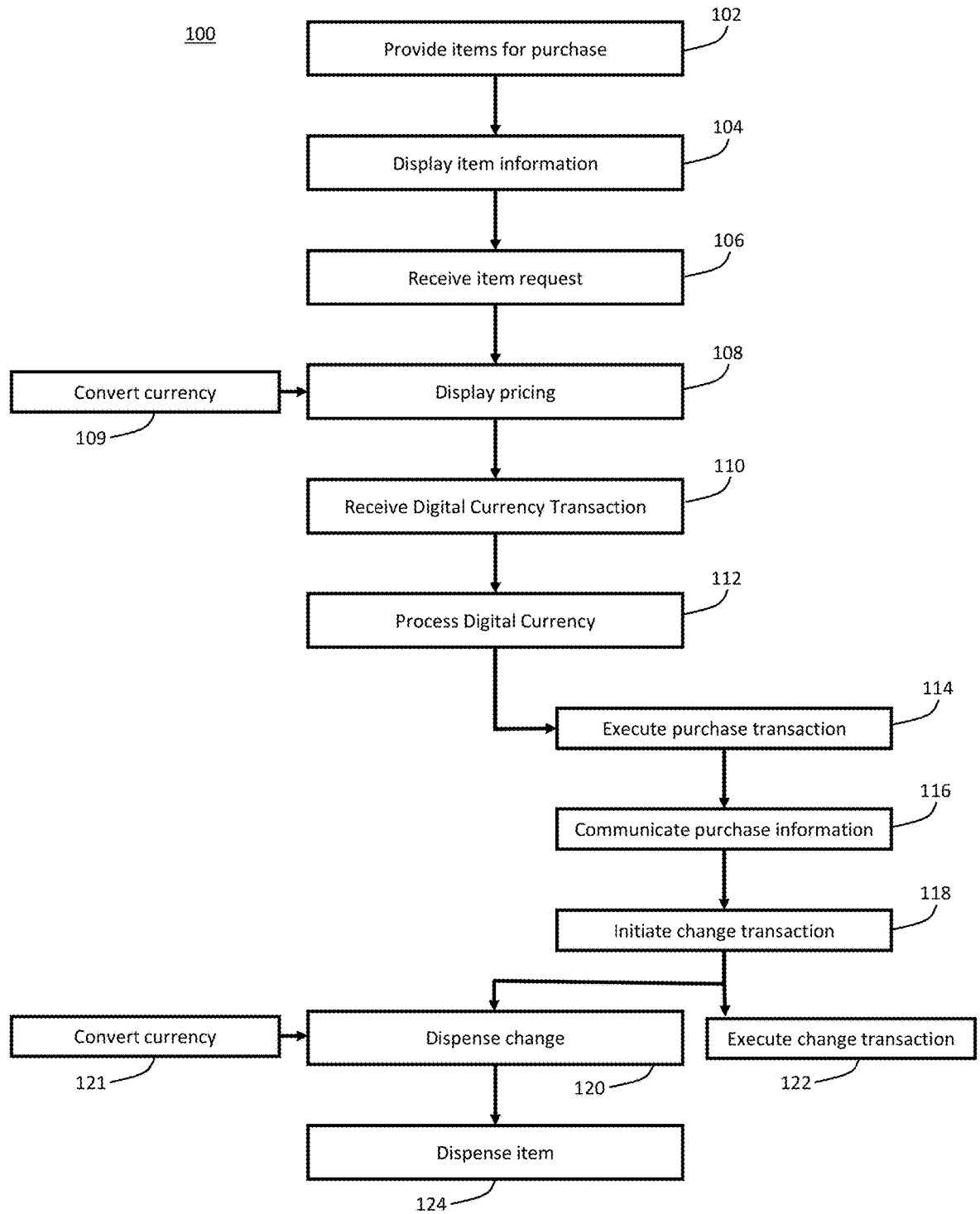
FIG. 4 shows a method flow of a vending machine according to embodiments.

FIG. 4 further describes a method of purchasing an item for sale from a vending machine using digital currency based on the example embodiments shown in FIGS. 1 and 2 and described above. In 102, items for purchase are provided within the vending machine. The items for purchase may include physical items to be dispensed by the vending machine, digital items (such as electronic media and licenses related thereto), and/or services (delivered via a system connected to the vending machine, such as a car wash, or conveying a credit, voucher, or other representation that may be redeemed for future services). In 104, item information is displayed by the vending machine. The items for purchase may be directly displayed, such as via a display window, to display item information and/or may be represented by displayed examples, advertisements, or interactive digital information (provided in item display overlay or through an electronic display, such as a touch panel computer). Item information may include pricing information in one or more currencies, including digital and non-digital currencies. In 106, an item request is received by the vending machine in the form of a selection made through an alternative selection device, via a more general purpose interface (such as a touch panel computer), or through another interface, such as digital wallet protocols. In 108, pricing is displayed in a format compatible with digital currency payment. In some embodiments, this may include confirming the pricing information for the item as presented in the displayed item information or it may include dynamically generating pricing based upon the currency involved. In 109, currency exchange rates enable conversion of currency between or among digital currency and non-digital currency. For example, the item information may default to price display in U.S. dollars, but upon selection may use real-time exchange rates for the digital currency to provide a current price in digital currency. In a system that supports multiple digital and non-digital currencies, price display may include side-by-side listing of the price in multiple currencies to enable a user to choose a preferred payment currency. In 110, the user elects to pay the offered price with digital currency and the vending machine receives a digital currency transaction from the user's store of digital currency, most likely from a smartphone or other portable computing device. For example, the URI of bit coin or other crypto currency may be transferred between the devices using the display and receipt of a QR code, via the internet, or using a digital wallet protocol over a short range wireless protocol, such as Bluetooth. In 112, the vending machine processes the digital currency payment. For example, by executing a purchase transaction 114 by recording the transfer through a remote digital currency system (such as recording a new transaction to a bitcoin block chain), communicating the successful payment as purchase information 116 through the multi-drop bus to other subsystems within the vending machine, and initiating a change transaction 118 in the event that the denomination of the payment currency exceeds the purchase price. In 120, change is dispensed from the vending machine. It may include non-digital currency based upon currency conversion 121 and communication through the MDB to the currency handler(s) or it may include executing an additional digital currency change transaction 122 and transferring the output to the user's smartphone using visual, internet, or short range wireless protocols. In 124, the payment criteria have been met and purchase information shared via the MDB trigger the item to be dispensed by the vending machine, such as actuation of a mechanical dispensing device controlled by the ASD.

Figure 5:
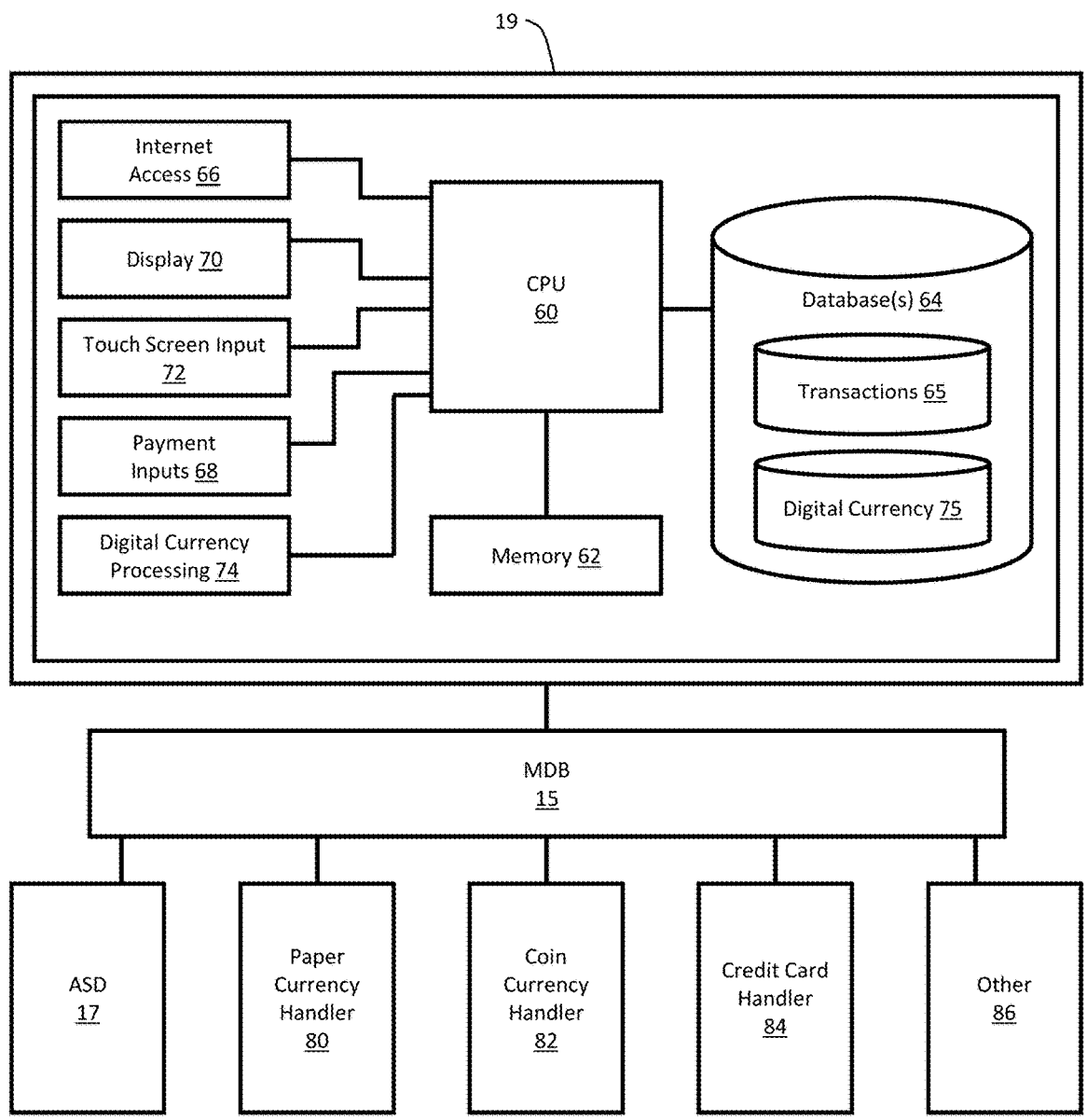
FIG. 5 shows a block diagram of a vending machine according to embodiments.

FIG. 5 shows the electronic subsystems of an example vending machine, such as the vending machines shown in FIGS. 1, 2, 3, and 6. The vending machine microcontroller 19 records and saves information regarding the activities of the vending machine and may provide information driven features of the vending machine, such as inventory control, preference survey, purchase activity, or other purposes. The microcontroller 19 includes a combination of hardware and software computing and data storage resources for accomplishing a variety of tasks, such as item viewing, selection, and delivery, including interactive item information and pricing information. A central processing unit (CPU) module 60 is operatively connected to a suitable memory 62; one or more databases 64, containing the information and data needed for the supply of items to be selected; internet access module 66; payment processing module 68; touch screen display module 70; touch screen input module 72; and digital currency processing module 74. The databases 64 may include one or more databases for managing digital currency received, stored, and used by the vending machine. For example, the databases 64 may include a digital currency repository 75 (including URIs and private key information) and a digital currency transaction log 65. The digital currency processing module 74 provides the protocols and workflows for executing purchase transactions, recording the transfer through a remote digital currency system (such as recording a new transaction to a bitcoin block chain), communicating the successful payment as purchase information through the multi-drop bus to other subsystems within the vending machine, and initiating a change transaction in the event that the denomination of the payment currency exceeds the purchase price. The digital currency processing module 74 may also include or access exchange information in order to convert price, payment, and change information among currencies, including digital and non-digital currencies. Other functions, as needed, can be added to the microcontroller 19 which is embedded within the vending machine.

The microcontroller 19 communicates with and may manage other vending machine subsystems using the MDB 15. For example, MDB 15 may provide access to ASD 17 for selection and dispensing of items; paper currency handler 80 for receiving, storing, and dispensing one or more paper currencies and/or denominations; coin currency handler 82 for receiving, storing, and dispensing one or more coin currencies and/or denominations; credit card handler 84 for receiving credit and debit card information and executing secure financial transactions in accordance with established financial network transaction protocols; and such other subsystems 86 as the vending machine may support.

Figure 6:
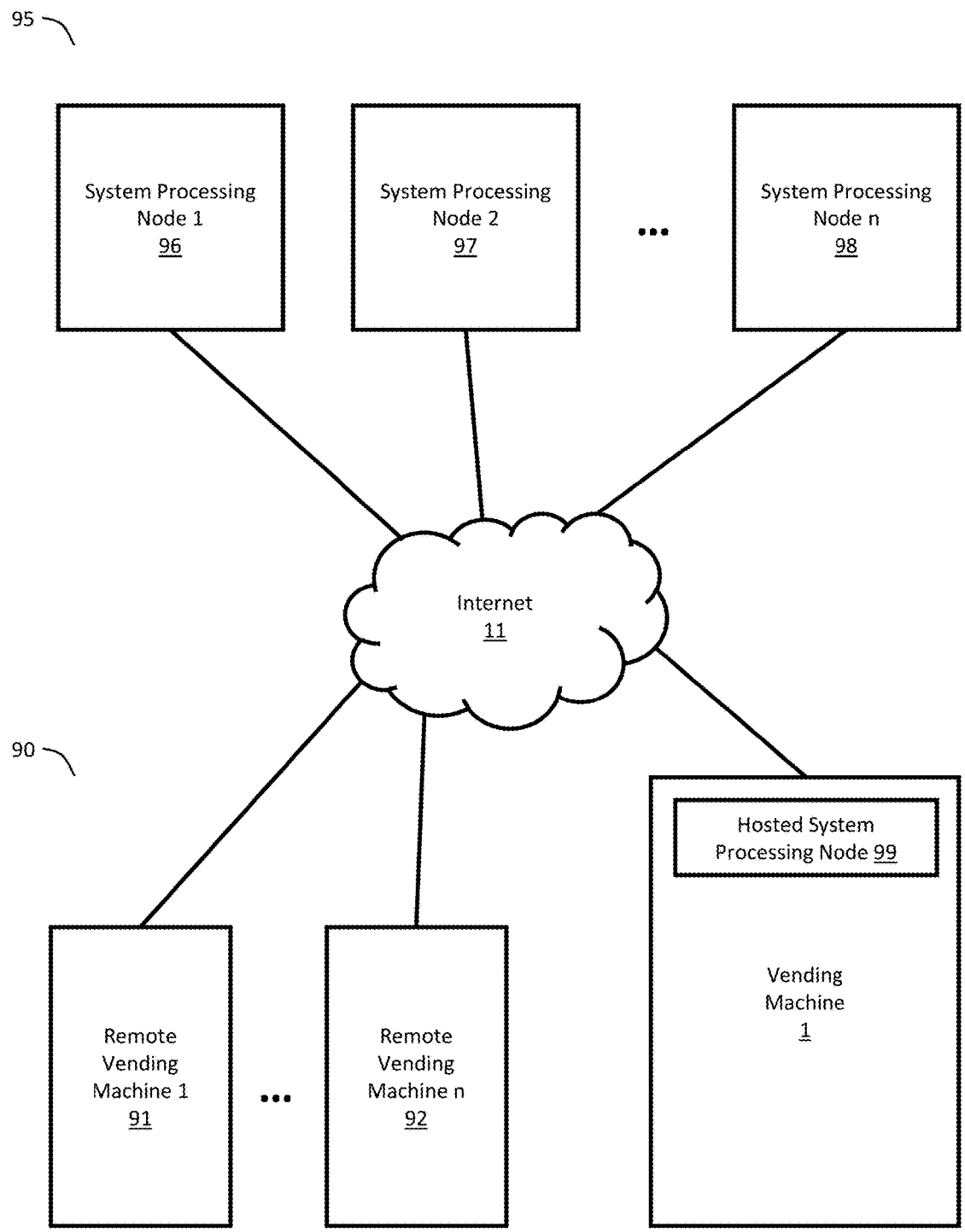
FIG. 6 shows a block diagram of a vending machine cluster and remote digital currency system according to embodiments.

FIG. 6 shows a vending machine cluster 90 and remote digital currency system 95 in communication over a network, such as internet 11. The vending machine cluster 90 includes a plurality of vending machines capable of communicating with one another over a network and with a level of trusted interaction and common management. For example, vending machine 1 may be under common ownership and control with remote vending machines 1 (91) through n (92). As part of the vending machine cluster 90, multiple vending machines may be able to share resources, potentially including internet access (or other communication resources), information processing, and/or data storage resources. Each vending machine in the cluster 90 may include all of the subsystems and resources of the vending machines shown in FIGS. 1 and 2, including the computing resources of microcontroller 19. Aggregation of user and transactional data may provide additional security and reliability for handling digital currency payments, including the use of a common pool of digital currency. In one embodiment, each vending machine in the vending machine cluster 90 includes a digital currency transaction storage repository and the digital currency transactions in the transaction storage repository include digital currency transactions executed by each of the vending machines, providing immediate and redundant storage of digital currency payments made in the cluster 90 by broadcasting each new transaction to the other vending machines. Because each vending machine in the cluster 90 is aware of the transactions completed in other vending machines in the cluster 90, the digital currency processing system in the vending machines can verify that digital currency transactions do not include double spending of digital currency. Because there may be lag in the processing and distribution of digital currency information in the remote digital currency system 95, this provides heightened transaction security within the vending machine cluster 90.

The remote digital currency system 95 is a peer-to-peer network including a plurality of system processing nodes 1 (96), 2 (97), through n (98) for recording digital currency creation and transactions. For example, in the bitcoin decentralized crypto currency system, each of the system processing nodes 96, 97, 98 is a miner node running on a computing system to add transaction records to the ledger of past transactions or block chain. This enables the issuance and use of URIs corresponding to units of the crypto currency while facilitating trusted, redundant, decentralized management. The updated block chain is periodically propagated across all nodes in the system. The vending machines in the vending machine cluster 90 conduct digital currency transactions by communicating with one or more of the system processing nodes 96, 97, 98. In some embodiments, one or more of the vending machines in the vending machine cluster 90 may also host a hosted system processing node 99 to directly participate in maintaining the remote digital currency system 95. Because the computing resources of any given vending machine may be idle for much of the time and many digital currency systems directly reward computing intensive processing with digital currency payments, there is an incentive to host such digital currency processing in the vending machines themselves.

Digital currency not being tied to any bank, credit card, or financial organization, stealing and corruption of the digital currency is a risk that must be faced in all of the above embodiments. In one embodiment, this is accomplished by building into the spending of any digital currency received in a transaction a time delay in the authorization process so that a fraudulent next transaction cannot be entertained or completed before the first digital currency transfer has been validated and appropriate transfer limitations entered.

While there are given above certain specific examples of this invention and its application in practical use, it should be understood that they are not intended to be exhaustive or to be limiting of the invention. On the contrary these illustrations and explanations herein are given in order to acquaint others skilled in the art with this invention and the principles thereof and a suitable manner of its application in practical use.

What is claimed is:

1. A vending machine comprising:
 a display area within the vending machine, the display area including a plurality of items for purchase;
 an input/output (I/O) vending interface on an exterior of the vending machine configured for a user to transmit an item selection and payment information to the vending machine via a visual format data information code, and further configured to initiate dispensing of a purchased item of the plurality of items for purchase from the display area of the vending machine;
 a transaction storage repository for storing at least one digital currency transaction;
 a communication pathway between the vending interface and a digital currency processing system associated with the vending machine and a plurality of nodes independent of the vending machine for settlement of the at least one digital currency transaction using a subset of an available digital cryptocurrency, the digital currency processing system including a blockchain ledger having the at least one digital currency transaction stored on the vending machine and a plurality of redundant blockchain ledgers stored on the plurality of nodes;

wherein the digital currency processing system is configured for a user to initiate the at least one digital currency transaction, executing an item purchase digital currency transaction and communicating resulting payment information for the item selection to the vending interface via the vending machine, and propagating a plurality of redundant blockchain ledgers of the user initiated digital currency transaction to the plurality of nodes after executing the item purchase digital currency transaction, and wherein the at least one digital currency transaction and the item purchase digital currency transaction are stored in the transaction storage repository and settled with the digital currency processing system; and a user initiated digital currency transaction interface whereby the digital currency processing system receives the at least one digital currency transaction from a portable computing device of the user, wherein the at least one digital currency transaction is received in the visual format data information code, and wherein the visual format data information code comprises a QR code and the user initiated digital currency transaction interface comprises a QR code reader connected to the vending interface;

whereby the purchased item is dispensed by the vending machine.

2. The vending machine of claim 1, wherein the at least one digital currency transaction is received in a uniform resource identifier.

3. The vending machine of claim 1, wherein the digital currency processing system initiates a change transaction for returning a non-digital currency amount to the user by executing a change digital currency transaction for dispensing change to the user, wherein the dispensed change includes the non-digital currency.

4. The vending machine of claim 1, further comprising a non-digital currency verifier and dispenser in communication with the vending interface and wherein the digital currency processing system initiates a change transaction by communicating an amount of dispensed change to the vending interface and whereby the vending interface causes the non-digital currency verifier and dispenser to dispense the change amount in non-digital currency.

5. The vending machine of claim 4, wherein the non-digital currency verifier and dispenser receives and verifies non-digital currency for a currency amount received and the digital currency processing system executes a change-dispensing digital currency transaction based on the currency amount received.

6. The vending machine of claim 1, further comprising a touch panel computer in communication with the vending interface and providing an interface for receiving the item selection and payment information, wherein the payment information includes initiation of the at least one digital currency transaction.

7. The vending machine of claim 1, further comprising an alternative selection device in communication with the vending interface, wherein the alternative selection device includes pricing information for the plurality of items for purchase in a non-digital currency value and wherein the digital currency processing system provides a non-digital currency to digital currency exchange rate for executing the item purchase digital currency transaction.

8. The vending machine of claim 7, further comprising a price display for dynamically displaying a current item price in digital currency value based on the pricing information in a non-digital currency from the alternative selection device and the digital currency exchange rate from the digital currency processing system.

9. The vending machine of claim 1, wherein the digital currency processing system provides a plurality of currency exchange rates including a non-digital currency to digital currency exchange rate and a plurality of exchange rates among a plurality of non-digital currencies and whereby the vending machine receives a first currency and the at least one digital currency transaction includes dispensing change in an alternate currency.

10. The vending machine of claim 1, wherein the display area further includes a plurality of interactive displays for the plurality of items for purchase, wherein the plurality of interactive displays are in communication with the vending interface to receive item information and a current item price in digital currency for display.

11. The vending machine of claim 1, further comprising a credit card processing device in communication with the vending interface for processing a secure credit transaction in non-digital currency for a currency amount received and the digital currency processing system executes a change digital currency transaction based on the currency amount received.

12. The vending machine of claim 1, the plurality of nodes comprises a network of other vending machines and the plurality of redundant blockchain ledgers include digital currency transactions executed by the digital currency processing system and other digital currency transactions executed by the other vending machines, whereby the vending machine and the network of other vending machines broadcasts each new digital currency transaction and the digital currency processing system within each of the plurality of vending machines independently verifies that digital currency transactions do not include double spending of digital currency.

13. The vending machine of claim 1, wherein the digital currency processing system includes a network of processing nodes for verifying digital currency transactions and wherein the internet connection is used to connect the digital currency processing system to a plurality of the network of processing nodes.

14. The vending machine of claim 13, further comprising a processing node in the network of processing nodes.

15. The vending machine of claim 1, wherein the digital currency processing system temporarily disables further digital currency transactions until settlement with the digital currency processing system and propagation of the plurality of redundant blockchain ledgers of the at least one digital currency transaction to the plurality of nodes.

16. The vending machine of claim 1, wherein the at least one digital currency transaction originates from a user's portable computing device selected from a smartphone, tablet, vehicle control computer, and product embedded computing device.

17. The vending machine of claim 1, wherein the transaction storage repository includes at least one uniform resource identifier embodying digital currency and at least one private key for executing the at least one digital currency transaction using the at least one uniform resource identifier.

18. A system comprising:
a vending machine housing an inventory of products therein, and configured for conveying a product of the inventory to a user;

an input/output (I/O) vending interface on an exterior of the vending machine configured for a user to transmit payment information to the vending machine via a visual format data information code for initiating conveying of the product of the inventory to the user;

a transaction storage repository for storing at least one digital currency transaction;

a communication pathway connecting the dispensation system and the vending interface to a digital currency processing system associated with the vending machine and a plurality of nodes independent of the vending machine for settlement of the at least one digital currency transaction using a subset of an available digital cryptocurrency, the digital currency processing system including a blockchain ledger having the at least one digital currency transaction stored on the vending machine and a plurality of redundant blockchain ledgers stored on the plurality of nodes;

wherein the digital currency processing system is configured for a user to initiate the at least one digital currency transaction, executing a product purchase digital currency transaction and communicating resulting payment information to the vending interface via the vending machine, and propagating a plurality of redundant blockchain ledgers of the user initiated digital currency transaction to the plurality of nodes after executing the product purchase digital currency transaction, and wherein the at least one digital currency transaction and the product purchase digital currency transaction are stored in the transaction storage repository and settled with the digital currency processing system, wherein the dispensation system conveys the product to the user after the product purchase digital currency transaction is executed; and a user initiated digital currency transaction interface whereby the digital currency processing system receives the at least one digital currency transaction from a portable computing device of the user, wherein the at least one digital currency transaction is received in the visual format data information code, and wherein the visual format data information code comprises a QR code and the at least one digital currency transaction interface comprises a QR code reader connected to the vending interface.

19. A system comprising:

an input/output (I/O) vending interface on an exterior of the vending machine configured for a user to transmit a product selection and payment information to the vending machine via a visual format data information code, and further configured to providing instructions to convey a product to a user;

a transaction storage repository for storing at least one digital currency transaction;

a communication pathway between the vending interface and a digital currency processing system associated with the vending machine and a plurality of nodes independent of the vending machine for settlement of the at least one digital currency transaction using a subset of an available digital cryptocurrency, the digital currency processing system including a blockchain ledger having the at least one digital currency transaction stored on the vending machine and a plurality of redundant blockchain ledgers stored on the plurality of nodes;

wherein the digital currency processing system is configured a user to initiate the at least one digital currency transaction, executing a product purchase digital currency transaction and communicating resulting payment information to the vending interface via the vending machine, and propagating a plurality of redundant blockchain ledgers of the user initiated digital currency transaction to the plurality of nodes after executing the product purchase digital currency transaction, and wherein the at least one digital currency transaction and the product purchase digital currency transaction are stored in the transaction storage repository and settled with the digital currency processing system; and a user initiated digital currency transaction interface whereby the digital currency processing system receives the at least one digital currency transaction from a portable computing device of the user, wherein the at least one digital currency transaction is received in the visual format data information code, and wherein the visual format data information code comprises a QR code and the at least one digital currency transaction interface comprises a QR code reader connected to the vending interface.

* * * * *

UNITED STATES PATENT AND TRADEMARK OFFICE
CERTIFICATE OF CORRECTION

| | |
|---|---|
| PATENT NO. | : 10,621,809 B2 |
| APPLICATION NO. | : 14/955636 |
| DATED | : April 14, 2020 |
| INVENTOR(S) | : Christopher M. Smolen and Stuart Card |

It is certified that error appears in the above-identified patent and that said Letters Patent is hereby corrected as shown below:

On the Title Page

In Item (71), under "Applicants," delete "Applicants: Christopher M. Smolen, Newport, NY" and insert -- Applicants: Christopher M. Smolen, Oneida, NY --, therefor Signed and Sealed this
Ninth Day of June, 2020

Andrei Iancu
*Director of the United States Patent and Trademark Office*